Oct. 12, 1937.   J. CAHN   2,095,312
EXPOSURE DETERMINING DEVICE FOR CAMERAS
Filed Sept. 6, 1935   2 Sheets-Sheet 1
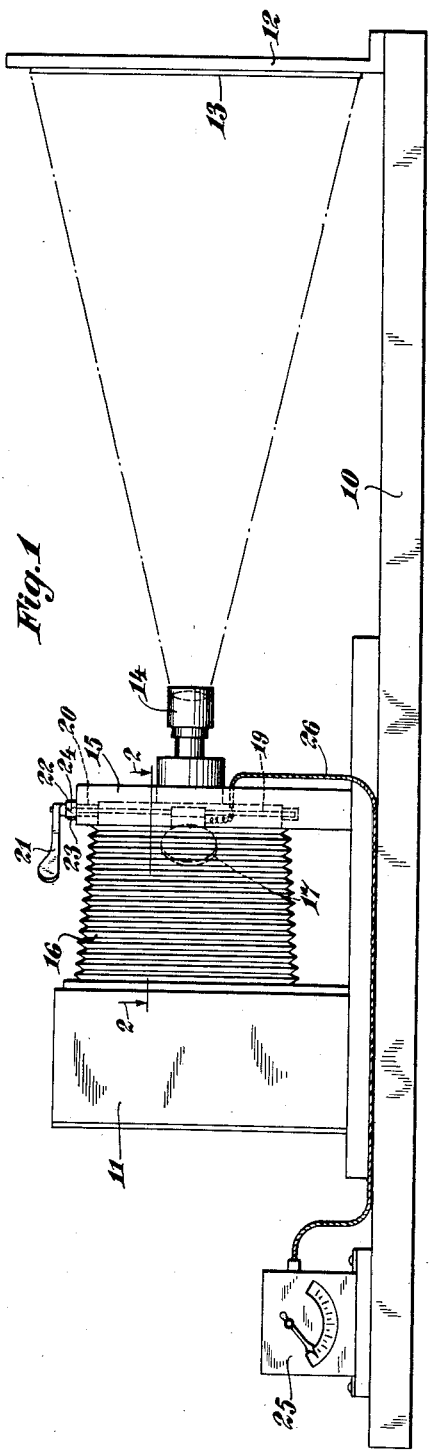
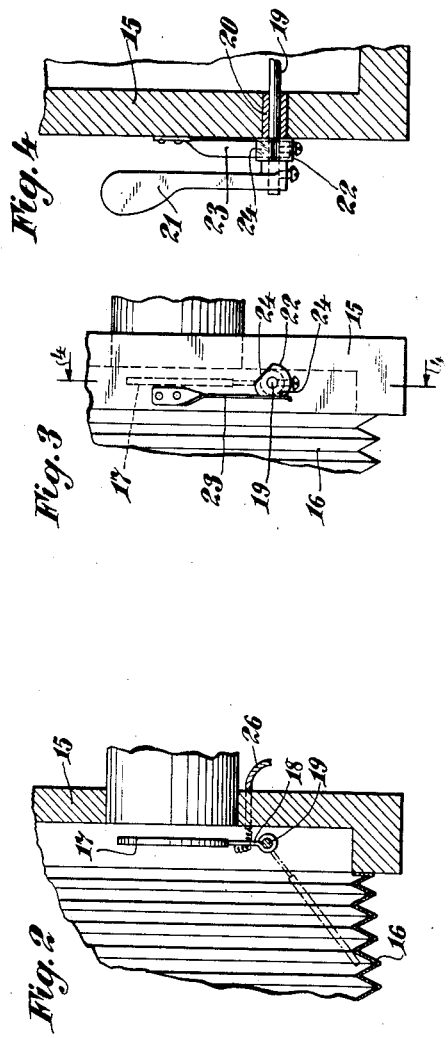
INVENTOR.
Jack Cahn,
BY Hoguet, Neary + Campbell,
HIS ATTORNEYS INVENTOR.
Jack Cahn, Patented Oct. 12, 1937

2,095,312

UNITED STATES PATENT OFFICE 2,095,312

EXPOSURE DETERMINING DEVICE FOR CAMERAS

Jack Cahn, New York, N. Y., assignor to Alco-Gravure Inc., New York, N. Y., a corporation of New York Application September 6, 1935, Serial No. 39,372

4 Claims. (Cl. 88—23)

The present invention relates to cameras and embodies, more specifically, an improved mechanism by means of which the exposure of subject matter to a sensitive film through a camera may be effectively controlled.

More particularly, the invention embodies an improved form of exposure determining device for cameras by means of which the length of exposure of the sensitive film is accurately and effectively determined in such fashion as to give absolutely uniform results with the camera regardless of the subject matter, lighting, etc.

Devices have heretofore been suggested which employ selenium cells for determining the exposure necessary for subject matter, the selenium cell being exposed to the subject matter in order to give an indication or measure of the intensity of light reflected therefrom. In these prior devices, the selenium cell has usually been mounted on the front or face of the camera, to one side of the objective lens, and connected with suitable measuring apparatus by means of which the light intensity is recorded. It has further been suggested to provide a mechanism by means of which the selenium cell is inserted in the plane of, or adjacent to, the sensitive plate, in order that suitable light measurements may be taken.

The foregoing mechanisms have not proved entirely satisfactory and it has been found that the securing of absolutely uniform and accurate results under all conditions cannot easily be accomplished therewith. Accordingly, the present invention has been designed and an object thereof is to provide a simple and effective mechanism in combination with a camera structure by means of which the exposure required for a given subject matter may be determined in such fashion as to insure absolute accuracy and uniform results under all conditions of operation.

A further object of the invention is to provide an exposure determining device of the above character which is so constructed and mounted as to be subjected to all of the light from the object passing through the objective lens, thus giving an accurate indication as to the amount of light falling on the sensitive film.

A further object of the invention is to provide a device of the above character wherein the light responsive element by means of which the proper length of exposure is determined is mounted in such manner as to be moved conveniently into and out of the path of light from the objective lens to the light-sensitive plate, the mounting being of such nature as to enable the device to be moved effectively from a measuring position to a retracted position in which the mechanism does not interfere with the normal operation of the camera.

Further objects and advantages, not enumerated above, will be readily apparent as the invention is described more specifically in connection with the accompanying drawings, wherein Figure 1 is a view in side elevation, showing a camera in which the present invention has been embodied;

Figure 2 is an enlarged view in horizontal section taken on line 2—2 of Figure 1 and looking in the direction of the arrows;

Figure 3 is a partial enlarged plan view of the forward portion of the camera upon which mechanism constructed in accordance with the present invention has been mounted;

Figure 4 is a view in section taken on the line 4—4 of Figure 3 and looking in the direction of the arrows;

Figure 5:
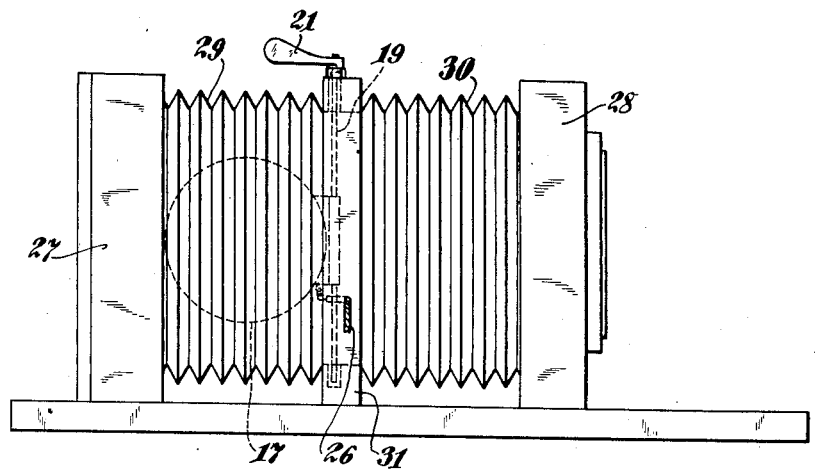
Figure 5 is a view in side elevation, showing a modified form of camera upon which the invention has been embodied.

In Figures 1 to 4 of the above drawings, a suitable supporting member such as a table 10 is shown upon which a camera 11 is mounted. A frame 12, at one end of the table, may be provided upon which objects 13 to be photographed may be supported. The foregoing association of elements is in accordance with standard practice, and in itself, forms no part of the present invention.

The objective lens and optical system of the camera is indicated at 14 and is carried by the movable front plate 15 of the camera. As is typical of cameras of this nature, the front plate is connected to the stationary part of the camera 11 by means of an opaque bellows 16.

Within the forward portion of the camera, and mounted within and by the front plate, is a selenium cell 17, carried by a suitable bracket 18 which is secured to a vertical spindle 19. The spindle 19 is suitably journaled in the front plate, a bushing 20 being provided for this purpose if desired. As shown in Figures 1 and 4, the spindle 19 extends upwardly from the top of the movable front plate 15 and may have secured thereto a manually operated lever 21, as well as a positioning bushing 22. A leaf spring 23 may be provided to engage the bushing which may be formed with flat surfaces 24 in order that the cell 17 may be yieldingly held in either of the two positions shown in Figure 2.

Connecting the cell or cells with a suitable measuring instrument 25 are wires 26 in order that the voltage generated by the cell or cells, by reason of the light falling thereon, may be impressed across the volt meter 25. The particular form of instrument 25 and circuit therefor may be varied, if desired, the present invention dealing only with the combination of elements by means of which the cell is mounted in the manner illustrated in the drawings and adapted to be moved into a position directly behind the objective optical system 14 and receive all of the light passing therethrough.

Figure 6:
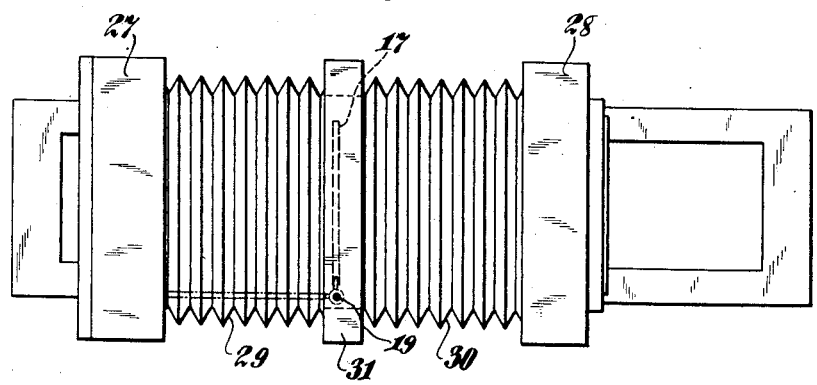
Figure 6 is a plan view of the device shown in Figure 5.

In the construction shown in Figures 5 and 6, the device is shown as being embodied in a modified form of camera at 27, having a movable front plate 28 within which the lens is supported, the bellows being formed of two sections 29 and 30 between which an intermediate movable partition 31 is secured. This intermediate partition serves as a support for the light-responsive mechanism previously described in connection with the construction shown in Figures 1 through 4. If desired, the intermediate partition 31 may be so mounted as to be moved automatically in definite relationship with respect to the camera 27 and front plate 28 and the partition thus serving not only as an intermediate bellows supporting member, but also as a means for supporting the light-sensitive member. Moreover, the member 17 may be provided with one or more cells which are mounted upon a common supporting member and adapted to be swung into and out of indicating position.

It will be readily apparent that the cell or cells may be conveniently and effectively moved from a measuring to a retracted position, and when in the latter position, the normal function of the camera is not interfered with. Moreover, by mounting the cell or cells in the above manner, and by subjecting it to all of the light from the object passing through the objective lens, an absolutely accurate and true indication of the intensity of light reflected from the object is given, thus enabling uniform results to be obtained under all conditions. Obviously, one or more cells may be used in the device.

While the invention has been described with specific reference to the construction shown in the accompanying drawings, it is not to be limited save as defined by the appended claims.

I claim:

1. In combination with a camera having a movable front plate carying an objective lens, a light-sensitive element adjacent the objective lens, and in the path of light passing through the lens, the size and position of the light-sensitive element being such that all of the light from an object passing through the lens falls on the element, a shaft rotatably mounted in the front plate on a vertical axis, means to mount the element fixedly on the shaft to be swung thereby from a position coaxial with the objective lens to a retracted position out of the path of light rays from the objective lens, and means operated by the element to indicate the intensity of the light from the objective lens.

2. In combination with a camera having a movable front plate carrying an objective lens, a light-sensitive element adjacent the objective lens, and in the path of light passing through the lens, the size and position of the light-sensitive element being such that all of the light from an object passing through the lens falls on the element, a shaft rotatably mounted in the front plate on a vertical axis, means to mount the element fixedly on the shaft to be swung thereby from a position coaxial with the objective lens to a retracted position out of the path of light rays from the objective lens, means outside of the camera to move the shaft on its axis, and means operated by the element to indicate the intensity of the light from the objective lens.

3. In combination with a camera having a movable front plate carrying an objective lens, a light-sensitive element adjacent the objective lens, and in the path of light passing through the lens, the size and position of the light-sensitive element being such that all of the light from an object passing through the lens falls on the element, a shaft rotatably mounted in the front plate on a vertical axis, means to mount the element fixedly on the shaft to be swung thereby from a position coaxial with the objective lens to a retracted position out of the path of light rays from the objective lens, said shaft and element being so positioned that all of the light from the objective lens will fall on the element, and means operated by the element to indicate the intensity of the light from the objective lens.

4. In combination with a camera having a movable front plate carrying an objective lens, a light-sensitive element adjacent the objective lens, a shaft mounted in the front plate on a vertical axis, means to mount the element on the shaft to be swung thereby from a position coaxial with the objective lens to a retracted position out of the path of light rays from the objective lens, said shaft and element being so positioned that all of the light from the objective lens will fall on the element, means outside of the camera to move the shaft on its axis, and means operated by the element to indicate the intensity of the light from the objective lens.

JACK CAHN.